United States Patent [19]

DeVille

[11] Patent Number: 5,519,647
[45] Date of Patent: May 21, 1996

[54] APPARATUS FOR AND METHOD OF GENERATING AN APPROXIMATION FUNCTION

[75] Inventor: Yannick DeVille, Villecresnes, France

[73] Assignee: U.S. Philips Corporation, New York, N.Y.

[21] Appl. No.: 241,088

[22] Filed: May 11, 1994

[30] Foreign Application Priority Data

May 12, 1993 [FR] France .................................. 93 05715

[51] Int. Cl.$^6$ .............................. G06F 1/02; G06F 7/38; G06E 1/00; G06E 3/00
[52] U.S. Cl. ......................... 364/721; 364/719; 364/720; 364/722; 364/723; 395/21
[58] Field of Search ................................... 364/721, 718, 364/719, 720, 723, 735; 395/21

[56] References Cited

U.S. PATENT DOCUMENTS

| | | | |
|---|---|---|---|
| 3,576,976 | 5/1971 | Russo et al. | 364/152 |
| 3,699,318 | 10/1972 | Underkoffler et al. | 364/719 |
| 3,789,203 | 1/1974 | Catherall et al. | 364/723 |
| 4,554,649 | 11/1985 | Kerkenhoff et al. | 364/421 |
| 4,774,685 | 9/1988 | Samuels | 364/718 |
| 4,809,196 | 2/1989 | Miller | 364/551.01 |

OTHER PUBLICATIONS

Lippmann, "An Introduction to Computing with Neural Nets", IEEE ASSP Magazine Apr. 1987, pp. 4–22.
Ishibuchi et al., "Regression Analysis with Interval Model by Neural Networks", 1991 IEEE International Joint Conference on Neural Networks, vol. 2, Nov. 18–21, 1991, pp. 1594–1599.

Primary Examiner—Roy N. Envall, Jr.
Assistant Examiner—Emmanuel L. Moise
Attorney, Agent, or Firm—Anne E. Barschall

[57] ABSTRACT

An apparatus (5) for generating an approximation function based on first pairs $((X_1, Y_1)$ to $(X_6, Y_6))$ of values associating a dependent variable $(Y_1$ to $Y_6)$ with an independent variable $(X_1$ to $X_6)$, and for determining second pairs $(X_A, Y'_A)$ of values of said variables in accordance with said approximation function. The apparatus comprises: a) first means (10) for iteratively determining at least one current linear regression function, for selecting that one of the current linear functions which produces the approximation of all the pairs of said series with minimal errors, and for coding the selected linear regression function with the aid of specific codes (p, q), and b) second means (17) for determining said second pairs $(X_A, Y'_A)$ with the aid of said specific codes. The apparatus can also be used for calculating approximated values of mathematical functions, for example a in a neural network, or for determining a regression function forming an approximation to experimental measurement results, for example distributed measurements resulting from monitoring an industrial process. The invention also relates to a method of generating an approximation function.

20 Claims, 8 Drawing Sheets

APPARATUS FOR AND METHOD OF GENERATING AN APPROXIMATION FUNCTION

FIELD OF THE INVENTION

The invention relates to an apparatus for and a method of generating an approximation function, which function is based on first pairs of values associating a dependent variable with an independent variable, and determining second pairs of values of said variables from said approximation function.

BACKGROUND OF THE INVENTION

An apparatus and a method of the type defined in the opening paragraph are known from patent specification U.S. Pat. No. 3,789,203, which describes a function generator employing approximation by iterative interpolation. Said apparatus is intended for data processing applications which require a calculation of functions such as, for example, sin(x), tan(x). This apparatus requires only a minimal storage capacity from a user device. Starting from two pints belonging to a function to be interpolated the method first interpolates the function by a straight line between the two points and then performs an approximation to deviations between the straight line and the function by polynomial approximations of increasing order. Subsequently, it replaces the initial points by approximate points in order to reduce the length of the segment between the points to be processed and, finally, it repeats the preceding operations.

Such a method requires extensive computing means and can be carried out only by means of powerful computers.

There are applications for which such a method cannot be employed because the available means are not adequate. Moreover, for certain uses it may be satisfactory to perform an approximate calculation of the function for a limited number of values of the independent variable.

This may concern a sigmoid function applied to neural potentials supplied by at least one neuron in a neural network. It may concern another non-linear function, for example a root function, for calculating distances between neuron states. The applications may also involve other devices such as function generators, computing devices and the like.

To calculate such a function without resorting to an approximation function various other ways can be used.

The exact mathematical calculation can be performed for each value of the independent variable to be processed by programming a computer by known methods. Such a method requires that each time the same operations are carried out, which may take a long time if the number of values is large.

It is also possible to store pre-calculated tables in a memory. The result can then be read rapidly from the memory. However, to cover all the possible values of the independent variable with an adequate resolution tables with a very high capacity are required. Consequently, these computing methods have disadvantages.

On the other hand, it may be required to identify two variables which are related to one another by pairs of values associating a dependent variable with an independent variable. Thus, in monitoring an industrial process it may be required to measure, for example, an efficiency R of an operation as a function of the temperature T at which this operation $R=f(T)$ is performed. To monitor the process batches of measurement pairs may be plotted in a graph. This may be effected to characterise the process or to derive new control parameters for said operation. This is described, for example, in the article by H. ISHIBUCHI and H. TANAKA, "Regression analysis with interval model by neural networks" in "IEEE International Joint Conference on Neural Networks", vol. 2, 18–21 November 1991, SINGAPORE. These new parameters should be representative of the basis of said operation and measurement fluctuations inherent of this type of process should be ruled out. It is therefore desirable to determine an approximation of the function f(.).

Thus, in a given case this may involve measurements which are erratic or afflicted with errors to be represented by an approximation function.

In another case accurate values are available but their envisaged use does not require a high accuracy and an approximation function will be adequate.

SUMMARY OF THE INVENTION

It is one of the objects of the invention to generate an approximation function using limited hardware means, enabling a limited number of values of the dependent variable suitable for the purpose to be calculated without the necessity of determining other values of the approximation function. It is another object to supply values which can be approximated to with a controlled maximum error.

This object achieved by means of an apparatus which is characterised in that it comprises:

first means:
  for iteratively determining at least one current linear regression function by making first errors of alternating sign equal in absolute value, which first errors have been measured between, respectively, first values of the dependent variable for three pairs of a series of said first pairs and second values of the dependent variable determined, in accordance with said current linear function, for the same values of the independent variable,
  for selecting that one of the current linear functions which produces the approximation of all the pairs of said series with minimal errors, and
  for coding the selected linear regression function with the aid of specific codes, and second means for determining said second pairs with the aid of said specific codes.

Thus, in an advantageous manner, a linear regression function is determined which is the best approximation to the different pairs of known values. The approximated results thus obtained form a satisfactory compromise for many uses of the function generation apparatus.

A linear regression function is a simplifying function representing a complex phenomenon by reducing the significant parameters. By representing the series of pairs of values as points in a two-dimensional space the linear regression function becomes a regression line.

Thus, after the regression line has been defined by codes an approximate value of the dependent variable on any point of the regression line can be calculated with limited means for arbitrary values of the independent variable.

The invention also relates to a method of generating an approximation function, which method comprises:

a first phase:
  for iteratively determining at least one current linear regression function by making first errors of alternating sign equal in absolute value, which first errors have been measured between, respectively, first values of the dependent variable for three pairs of a series of said first pairs and second values of the dependent variable determined, in accordance with said current linear function, for the same values of the independent variable, for selecting that one of the current linear functions which produces the approximation of all the pairs of said series with minimal errors, and for coding the selected linear regression function with the aid of specific codes, and a second phase for determining said second pairs with the aid of said specific codes.

The means employed by the invention may comprise a programmed computer or a dedicated circuit. The means may also utilise neurons.

An apparatus in accordance with the invention utilising neurons may be employed in a neural network and may in particular form a sub-system of this network. For a correct operation the neural network should include means for applying a non-linear activation function to the neural potentials which it supplies. According to the invention the apparatus provided with neurons can compute an approximation to this non-linear activation function. It can also compute distances between neuron states by computing an approximation to a square root function intended for use in the neural network.

When the size of the series of pairs of values supplied initially is large the series of pairs may be divided into a plurality of sub-sets in order to determine a plurality of regression lines and thus improve the approximation accuracy. Thus, the function of approximation of the series of pairs is a linear function in pieces, for which continuity between the pieces may or may not be required.

Certain pairs of the set of pairs of values may have a special influence, which can be realised by assigning a specific weighting coefficient to each pair. In that case the error associated with each pair allows for the specific weighting coefficient.

These and other aspects of the invention will become apparent from and will be explained on the basis of embodiments described hereinafter.

BRIEF DESCRIPTION OF THE DRAWINGS

The invention will be more fully understood with the aid of the following Figures, given by way of non-limitative examples, in which:

FIG. 13 is a representation of an approximation function formed by a plurality of lines.

FIG. 14 gives two representations (FIG. 14A and FIG. 14B) showing a determination of validity limits of two consecutive lines.

DESCRIPTION OF EMBODIMENTS

The invention relates to the approximation of a known function only via a given number of points, for example $P_1 \ldots P_6$ (FIG. 1) in a two-dimensional representation. Each of these points is defined by a pair of values (x,y) associating the independent variable x with the dependent variable y. Later on, there will be mention of a pair (or triplet) of points, involving two pairs (or three pairs) of values. The points are arranged in accordance with an increasing order of the abscissa values $X_i$, which defines an index i which increases with said values. An inverse convention can be adopted by accordingly modifying the following statement.

Figure 1:
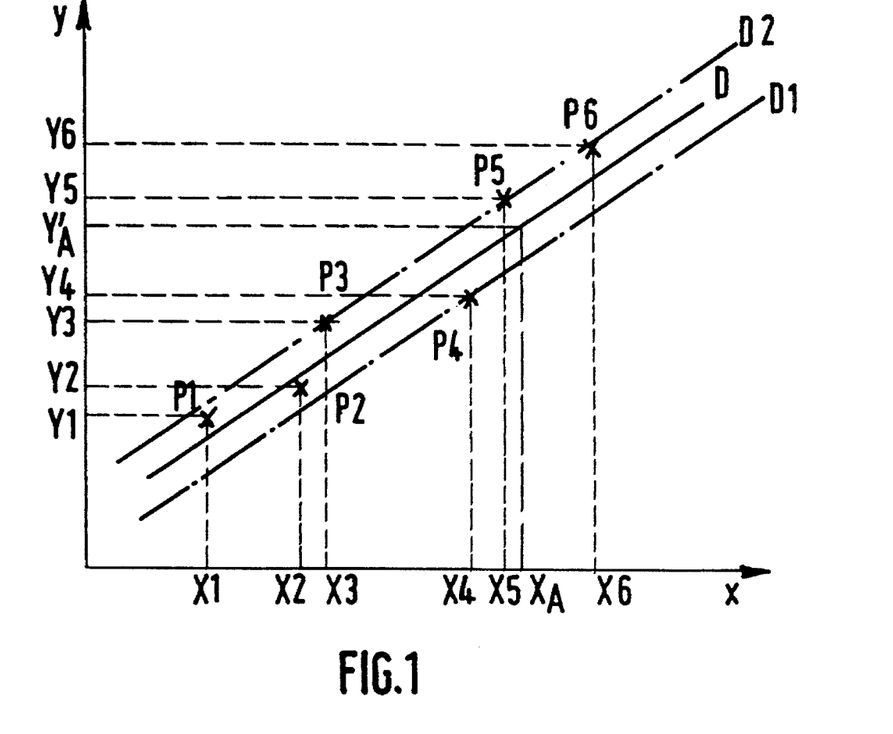
FIG. 1 is a graph showing a two-dimensional representation of a set of points with a regression line D.

According to the invention the set of pairs $(X_1, Y_1)$, $(X_2, Y_2)$ ... is approximated to by a regression line D having the following equation:

$$D: y = p.x + q. \qquad (1)$$

where x and y are current variables.

For this three pairs of values, for example $(X_3, Y_3)$, $(X_4, Y_4)$, $(X_5, Y_5)$ are considered in a first variant and a regression line D is determined by balancing of the absolute errors. An error is measured by the difference, for a given abscissa x, between the y value of the point and the abscissa measured for this point on the regression line. Balancing of errors at three points consists in having three errors equal in absolute value with an error sign opposite to the two others for the point having an abscissa x situated between the abscissae x of the two other points. Subsequently, it is examined if for the remaining points of the set the error which separates them from the line remains smaller or equal in absolute value than/to the previously determined error for the three selected points. This is due to the fact that one is interested in a worst-case error relating to the set of all the points to be considered, i.e. the largest error, in absolute value, between one of the points and the regression line. If all the errors are actually smaller or equal the line is selected to represent the points and, if this is not the case, the operations are repeated with three new pairs of values in order determine another regression line.

There may be a plurality of regression lines representing all the points of the set. In accordance with the method the optimum regression line is determined to minimise the worst-case error defined above.

FIG. 1 shows an example comprising six points $P_1$ to $P_6$ in a two-dimensional representation. Now the final result will be considered for explanatory purposes. It will be noted that the regression line D in FIG. 1 is situated in such a manner that the errors are equal in absolute value for the points $P_3$, $P_4$ and $P_5$. For the points $P_1$, $P_2$, $P_6$ the errors are smaller in absolute value than the preceding ones. In a set of points $P_1$ to $P_6$ the method will thus consist in finding the three particular points, in the present case $P_3$, $P_4$, $P_5$, which enable the optimum regression line to be determined which minimises the worst-case error, and in subsequently coding this line. If in the case that FIG. 1 represents a final result two straight lines $D_1$ and $D_2$ are drawn parallel to the regression line D and passing through the points $P_3$, $P_5$, on the one hand, and $P_4$, on the other hand, it will appear that all the points of the set are situated within a band bounded by the lines $D_1$ and $D_2$ or are situated on these lines.

The phase of determining the regression line may lead to several variants, of which only the most advantageous ones will be described hereinafter.

First Variant of the First Phase of the Method

Figure 3:
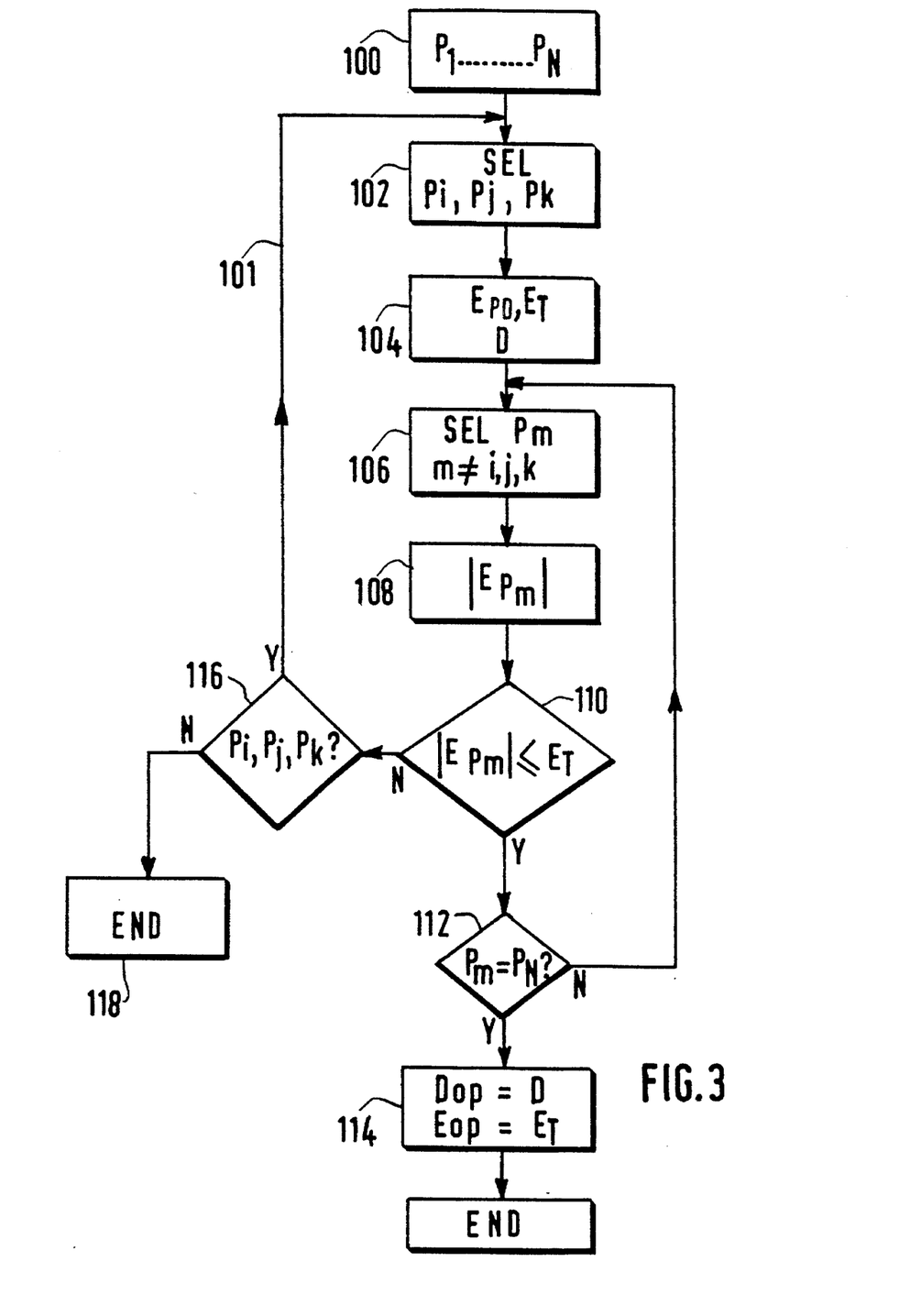
FIG. 3 is a flow chart of a first variant for carrying out the method on the basis of triplets of points.

FIG. 3 shows the series of steps to be performed in order to determine the optimum regression line.

From the set of points $P_1 \ldots P_N$ (block 100) three arbitrary points (block $P_i$, $P_j$, $P_k$ are selected, for which i<j<k. These three points serve to determine the regression line which minimises the error on y for these three points. This determination is effected analytically, preferably by programmed means. A regression line D is determined such that three errors (block 104):

$$E_{PD}(P_i, D), E_{PD}(P_j, D), E_{PD}(P_k, D)$$

between the line D and each of the points comply with:

$$E_{PD}(P_i, D) = -E_{PD}(P_j, D) = E_{PD}(P_k, D)$$

where $$E_{PD}(P_i, D) = Y_i - (p.X_i + q)$$

and with similar relationships for the other errors.

The regression line D is determined with the aid of the coefficients p and q of equation (1) so that:

$$p = \frac{Y_k - Y_i}{X_k - X_i}$$

and $$q = \frac{X_j.Y_i - X_i.Y_j + X_k.Y_j - X_j.Y_k + X_k.Y_i - X_i.Y_k}{2(X_k - X_i)}$$

The error relating to a triplet $(P_i, P_j, P_k)$ is then written as follows:

$$E_T(P_i, P_j, P_k) = |E_{PD}(P_i, D)|$$

When the error $E_T$ has thus been calculated it is ascertained whether the other points of the set produce errors whose absolute values are smaller than or equal to those of the points $P_i$, $P_j$, $P_k$. For this purpose an additional point $P_m$ (block 106) is selected and the absolute value is calculated for the error $E_{Pm}$ (block 108) between the value of the variable y at the point $P_m$ and the line D.

When this error $E_{Pm}$ has an absolute value smaller than or equal to $E_T$ (block 110) (reference Y) the additional point $P_m$ is accepted and the method proceeds (block 112) with a following additional point (block 106). If all the additional points meet the criterion $|E_{Pm}| \leq E_T$ the line D is accepted and its coefficients are used to code the optimum regression line $D_{opt}$ (block 114).

When this error $E_{Pm}$ is larger than $E_T$ (block 110) (reference N) the selected triplet of points $P_i$, $P_j$, $P_k$ is not accepted and another triplet of points (block 116) is chosen (link 101) from the set of points (block 102). The method ends when a line D (block 114) is obtained which meets this criterion even if all the triplets of points have not been examined.

Situations may occur in which at the end of step 116 all the possible points have been examined and none of the triplets has provided a solution (block 118). In that case it is possible to resume the program flow of the first variant by replacing the test in block 110 by the following test:

$$|E_{Pm}| \leq \alpha.E_T.$$

where $\alpha$ is a coefficient slightly greater than 1. In this situation it is also possible to resort to the second variant.

The first phase may include the following steps:

A—selecting three pairs of values from said series,

B—calculating the current linear regression function D and determining an associated triplet error $E_T = |E_{PD}|$, C—selecting an additional pair, D—calculating an additional error $E_{Pm}$ between the additional pair and said function, E—if $|E_{Pm}| \leq E_T$(110) for the additional pair the method proceeds with step C with a following additional pair, and F—if $|E_{Pm}| > E_T$ for at least one additional pair the method proceeds with step A with a selection of another group of three pairs from said series of pairs, and G—if $|E_{Pm}| \leq E_T$ for all the additional pairs the current linear regression function is coded and stored as a linear approximation function.

It may be elected to examine the set of triplets by choosing an increasing order, a decreasing order or a random order for this examination. The triplet which will be retained in order to determine the regression line can therefore be detected at an arbitrary instant in the course of this examination. It is evident that the speed with which the regression line is obtained depends on the instant at which the triplet is detected. Its implementation exhibits a degree of complexity ranging from N to $N^4$, where N is the number of initial points. Its complexity is therefore smaller for a small number of points. This variant enables a hardware implementation with a high degree of parallel processing. It is highly immune to truncation of the values and it provides an exact result.

Second Variant of the First Phase of the Method

Figure 4:
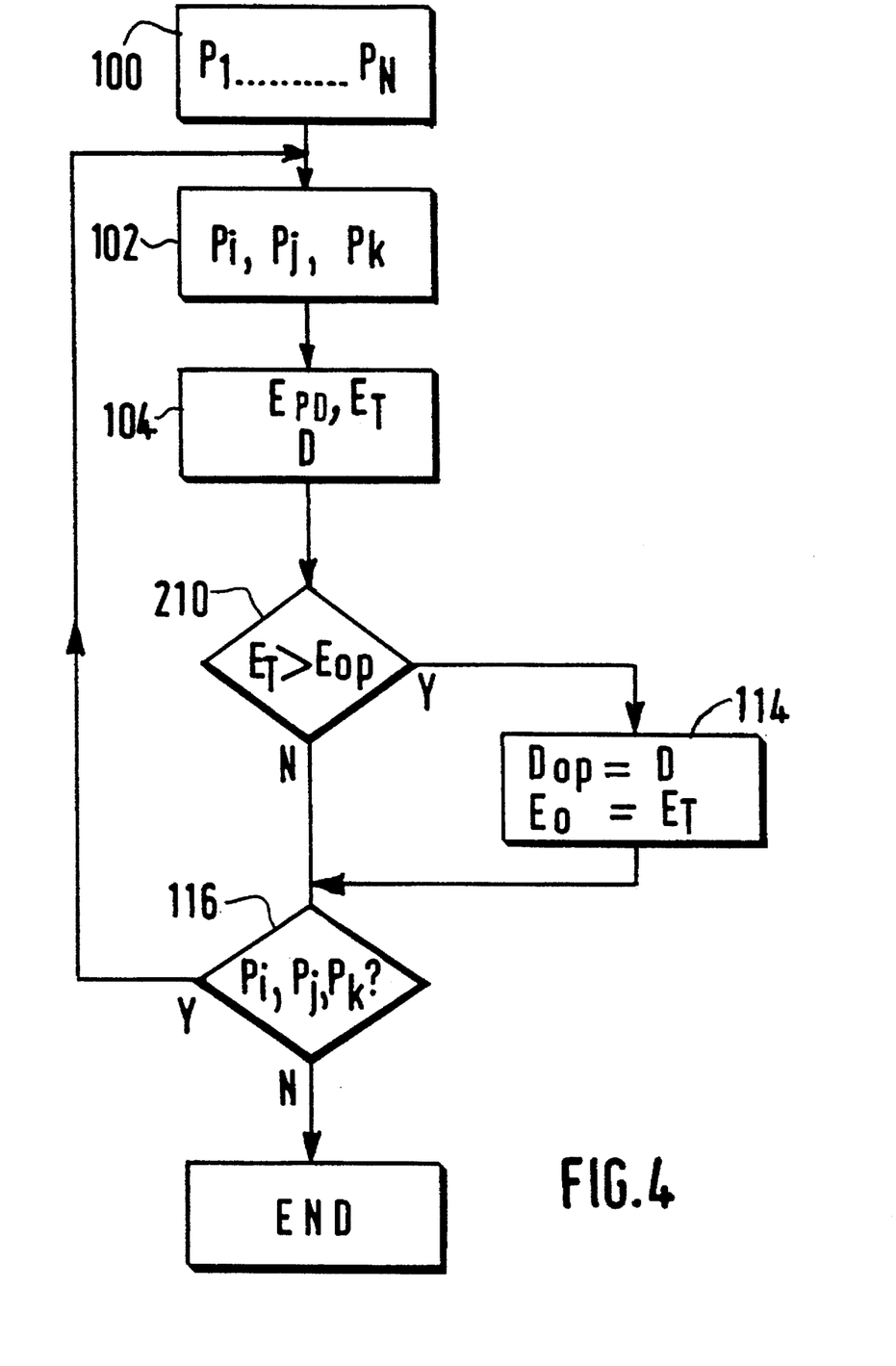
FIG. 4 is a flow chart of a second variant for carrying out the method on the basis of triplets of points.

In this second variant (FIG. 4) triplets of points are selected successively, a regression line is calculated each time and, by recursion, the line is selected which provides the largest error $E_{PD}$, i.e. which corresponds to the worst-case error for the set of points considered.

In the second variant the first phase includes the following steps:

A—selecting three pairs of values from said series,

B—calculating the current linear regression function D and determining an associated triplet error $E_T = |E_{PD}|$, C—comparing the error $E_T$ with an optimum error $E_{op}$ having a strictly negative initial value, D—if $E_T > E_{op}$ updating the optimum error $E_{op}$ by replacing $E_{op}$ by $E_T$ and updating the codes of an optimum linear regression function $D_{op}$ by replacing these codes by the codes of the current linear function D, E—subsequently returning to step A to select three other pairs, and F—when all the triplets of pairs of values of the series have been checked the last codes of the optimum linear function $D_{op}$ will form the codes of the linear approximation function.

Each time that a triplet is examined the error $E_T$ of this triplet is compared with the previously stored optimum error and the optimum error $E_{op}$ is updated with the largest value of the error $E_T$ determined for each triplet. The optimum line parameters are also updated. Before step A is carried out the value $E_{op}$ should be set to a small negative value, for example $-1$.

In this case the speed with which the regression line is obtained does not depend on the method of examining the triplets. Its complexity is of the degree $N^3$. A hardware implementation may benefit from the high degree of regularity of the algorithm used. It is highly immune to truncation of the data and it provides an exact solution.

Third Variant of the First Phase of the Method

Figure 5:
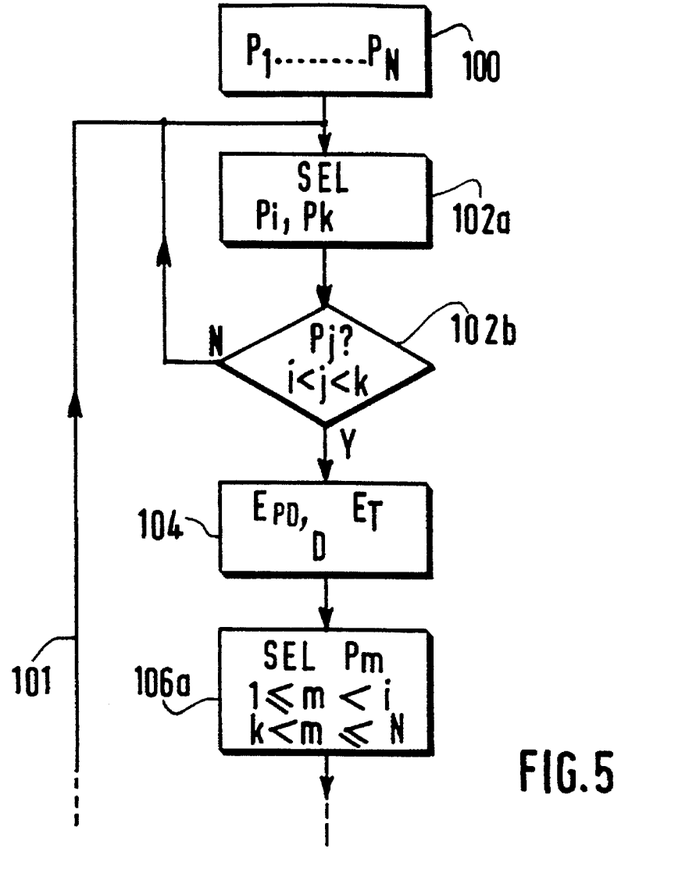
FIG. 5 is a flow chart of a third variant for carrying out the method on the basis of pairs of points.

In this third variant (FIG. 5) first of all a pair of points is selected to which an additional point situated between these two points is added in order to form a triplet of points. For this purpose the steps A, B and C of the first variant are modified, the other steps remaining the same. The modified steps are as follows:

A1—modification of step A by effecting a selection of two pairs of values belonging to said series, such that there is at least one additional intermediate pair with an independent variable $(X_1-X_6)$ situated between the independent variables of said pair in order to form at least one triplet of pairs, A2—modification of step A, firstly, by determining a subsidiary linear function which contains the two selected pairs and, secondly, by determining second errors between the dependent variables of the possible intermediate pairs and said subsidiary linear function:

and, when these second errors all have the same sign, selecting the intermediate pair producing the second error having the largest absolute value in order to form a triplet of pairs of values formed by the intermediate pair and the two selected pairs, and, when these second errors have different signs, resuming the method in step A1, B1—step B is effected with said selected triplet, C1—modification of step C by selecting an additional pair whose independent variable is not situated between the independent variables of the two selected pairs.

When the error $|E_{Pm}|$ is larger than the error $E_T$ (block 110) the method returns to step A1 (link 101) with a new selection of a pair of points (block 102a).

It is to be noted that the development of this third variant depends on the scanning of the values and, consequently, on the values themselves. The complexity of this variant varies between N and $N^3$, which gives it some advantage over the preceding variants. The means by which it is implemented can operate in parallel to a substantial degree but the implementation of the means may lack regularity, which may be a handicap for its integration. This variant has a high immunity to rounding errors of the values and it provides an exact solution.

Fourth Variant of the First Phase of the Method

This concerns the derivation of the regression line from envelopes.

The number of triplets to be examined can be reduced by determining the respective upper and lower envelopes surrounding the outer points in the two-dimensional representation of the set of points. An upper envelope or a lower envelope is defined in such way that when two arbitrary adjacent points of the envelope are connected by a straight line all the other points are situated at the same side of the upper envelope or the lower envelope, respectively. In this way all the points belonging to these envelopes are determined.

The determination of the regression line will consist in considering pairs of adjacent points of one of the envelopes, which are combined with an intermediate point which does not belong to said envelope in order to form a triplet, and proceeds as described for the pairs of points of the third variant. If no optimum solution has been found the pairs of points of the other envelope will be considered.

To realise an envelope a pair of adjacent points belonging to the envelope is selected. Then it is determined whether there is a point situated in such a way that its abscissa is intermediate between the abscissae of the selected points. When this point does not exist another pair of points of the same envelope is selected. For certain pairs, when it appears that there are one or more of these intermediate points, the intermediate point which is remotest from the straight line containing the two points of the pair is selected to form a triplet and to determine a regression line. To determine if this regression line can be selected as the optimum regression line the method uses the same operations as described above for the third variant.

Figure 6:
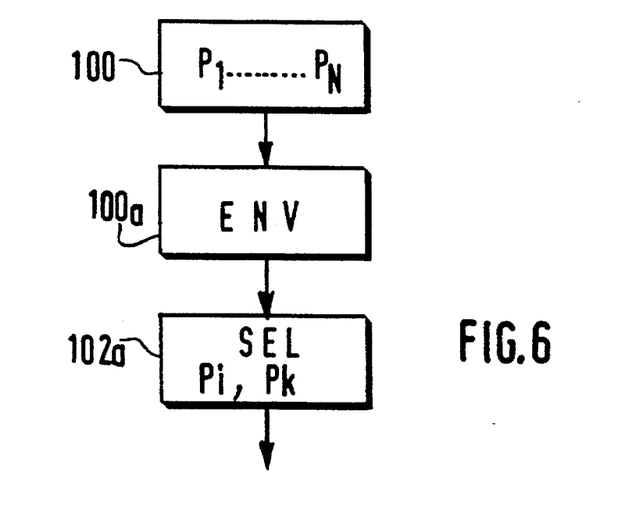
FIG. 6 is a part of a flow chart representing a preselection of points belonging to a lower envelope or to an upper envelope of the set of points.

For this purpose the third variant is modified in such a manner (FIG. 6) that, prior to the step 102a (FIG. 5), the first phase of the method includes a step (block 100a) to determine a lower envelope and/or an upper envelope which interconnect the outer points of the set of points, the selection of the pairs of points in the step 102a being made from adjacent points belonging to one of the envelopes. Said pair of points is selected when there is at least one intermediate point having an abscissa situated between the abscissae of the points of the pair of points. If them are a plurality of intermediate points the triplet is formed with the intermediate point which is remotest from the straight line through the two points forming the pair of points. If no solution is found with the first envelope processing proceeds with the second envelope.

Figure 7:
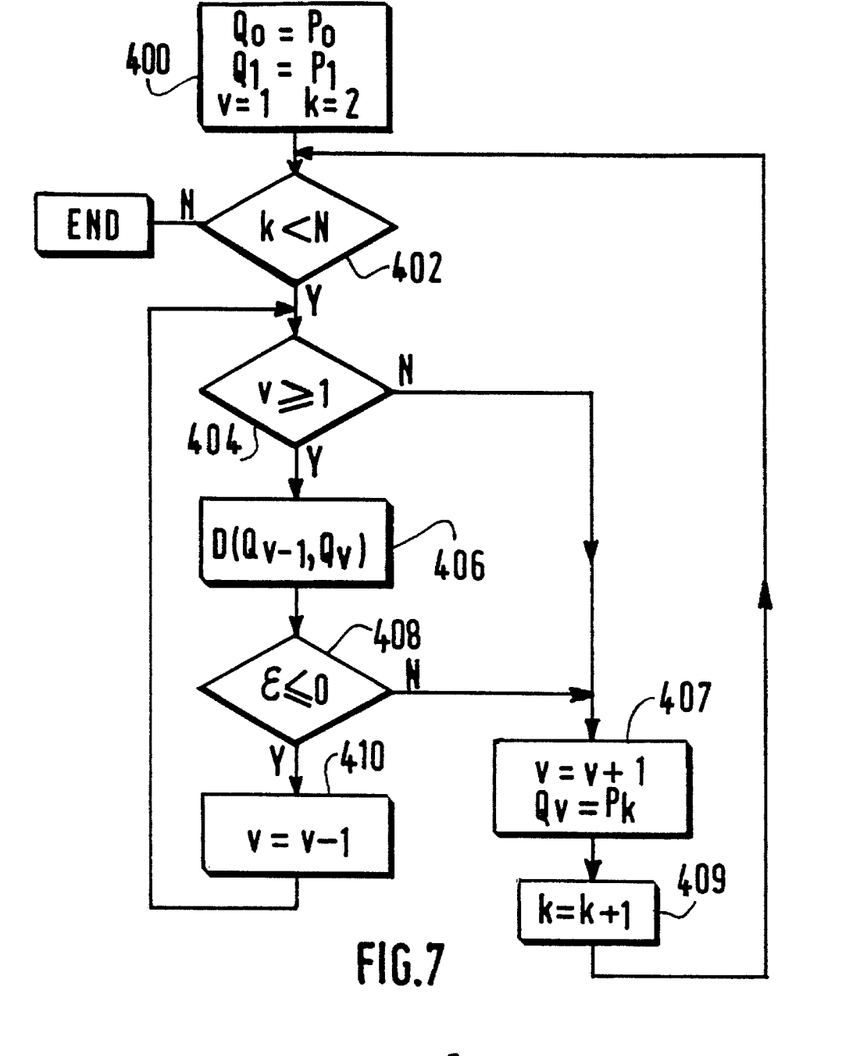
FIG. 7 is a flow chart for determining lower and upper envelopes.

The lower and upper envelopes are determined in accordance with the flow chart in FIG. 7. Since the index of the points increases as the variable x increases, the first point $P_o$ forms part of both envelopes. Referring now to the lower envelope, the points belonging to the lower envelope bear the reference letter Q. A current point $Q_v$ has the index v.

In the step 400 the first two points of the envelope are: $Q_o=P_o$ and $Q_1=P_1$. The last current point $Q_v$ is referenced v=1 for $P_1$. The number k of points processed is counted.

Step 402: a first test is carried out to determine if the last point $P_{N-1}$ has been processed to detect the end of the envelope determination.

Step 404: in the opposite case it is checked if $v \geq 1$. If $v<1$, v is incremented (v=v+1) and the point $P_k$ is taken as the point $Q_v$ (step 407). The index k is incremented to process the next point P (step 409) and the method proceeds to step 402.

If v'4 1, a straight line which passes through the points $Q_{v-1}$ and $Q_v$ (step 406) is computed and the sign $\epsilon$ of the error on the dependent variable between the current point $P_k$ and this line $(Q_{v-1}, Q_v)$ is determined. This is in order to determine if the current point is situated above or below the line $(Q_{v-1}, Q_v)$.

When the signal $\epsilon \leq o$, the last point $Q_v$ should be removed, v should be decremented in such a way that v=v−1 (stage 410), and the method should proceed with step 404. In this way, it may be required to remove certain points already accepted when a following point makes it necessary to cancel them.

When the sign ε is strictly positive the method proceeds to step 407 with a following point.

This flow chart relates to the determination of lower and upper envelopes by inverting the sign of the error to be considered.

Figure 2:
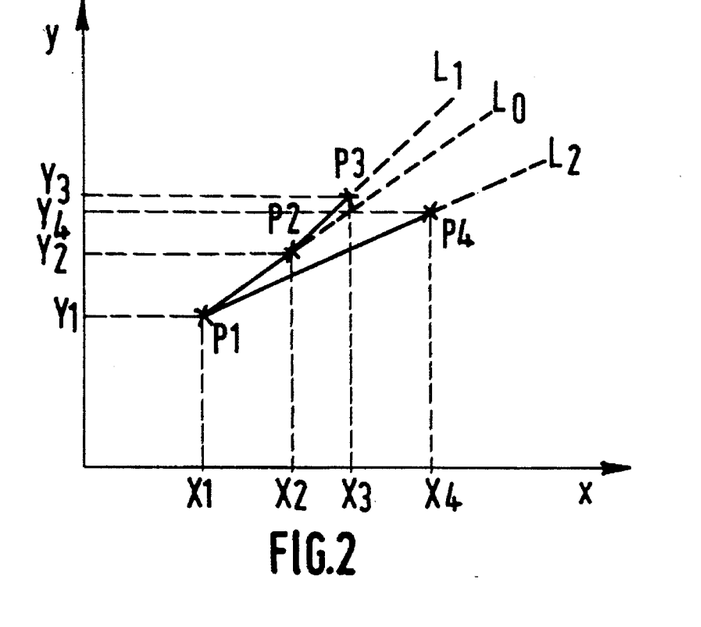
FIG. 2 is a graph showing a set of points and lines which serve for determining an envelope.

To understand the mechanisms that are used the simple case formed by the points $P_1$, $P_2$, $P_3$, $P_4$ in FIG. 2 is now considered by way of example and the lower envelope is determined. The point $P_1$ is the first point of the envelope, so that $Q_o = P_1$. $P_2$ is taken as the second point $Q_1$. The straight line $L_o$ connecting $P_1$ and $P_2$ is computed. The segment $P_1$, $P_2$ is accepted as the first segment of the lower envelope. It is checked whether $P_3$ is situated above the line $L_o$, which is the case in FIG. 2. The segment $P_2$ $P_3$ is accepted as the second segment of the lower envelope. Subsequently, the straight line $L_1$ connecting $P_2$ and $P_3$ is calculated and it is checked whether $P_4$ is situated above the line $L_1$. This is not the case in FIG. 2. Therefore, the point $P_3$ and the line $L_1$ are first moved aside. Likewise, $P_4$ is situated below the line $L_o$ and the point $P_2$ and the line $L_o$ are also moved aside since they cannot belong to the lower envelope, the process proceeding with the determination of the straight line $L_2$ connecting $P_1$ and $P_4$, after which the next points (not shown) are examined.

The complexity of carrying out this variant based on envelopes is of the degree $N^2$ and depends on the data scanning order. This complexity is smaller than that of the preceding variants and therefore it rapidly yields a result. The implementation regularity is average but this variant has a high immunity to rounding errors of the values and it provides an exact solution.

For certain uses it may be desirable to improve the accuracy of determining the approximation function in given ranges of the independent variable x and to assign weighting coefficients $W_i$ to the points $P_i$. This is the case, for example, when the approximation function can vary slightly with the independent variable x. Then weighting coefficients may be assigned to certain points. These may be common to a plurality of points or they may be individual for each point. Hereinafter, these weighting coefficients $W_i$ are considered to be strictly positive.

In the case in which there are weighting coefficients an error $E_{PD}$ between a point $P_i$ and the regression line D is defined as:

$$E_{PD}(P_i, D) = W_i \cdot [Y_i - (p \cdot X_i + q)]$$

where $E_{PD}$ is a value having a sign. The determination of the regression line D for three points $P_i$, $P_j$, $P_k$ is then modified in such a manner that the variables p and q of equation (1) become:

$$p = NUMP/DET \text{ and } q = NUMQ/DET \quad (2)$$

where the quantities NUMP, NUMQ and DET are defined by:

$DET = W_i \cdot W_j \cdot (X_j - X_i) + W_j \cdot W_k \cdot (X_k - X_j) + W_i \cdot W_k \cdot (X_k - X_i)$ $NUMP = W_i \cdot W_j \cdot (Y_j - Y_i) + W_j \cdot Wk \cdot (Y_k - Y_j) + W_i \cdot W_k \cdot (Y_k - Y_i)$ $NUMQ = W_i \cdot W_j \cdot (X_i \cdot Y_j - X_i \cdot Y_j) + W_j \cdot W_k \cdot (X_k \cdot Y_j - X_j \cdot Y_k) + W_i \cdot W_k \cdot (X_k \cdot Y_i - X_i \cdot Y_k)$ Moreover, the error $E_T$ associated with this triplet can be expressed and calculated by:

$$E_T(P_i, P_j, P_k) = |E_{PD}(P_i, D)|$$

where $$E_{PD}(P_i, D) = -E_{PD}(P_j, D) = E_{PD}(P_k, D)$$

or $$E_T = \frac{W_i \cdot W_j \cdot W_k \cdot |(X_i \cdot Y_j - X_j \cdot Y_i) + (X_j \cdot Y_k - X_k \cdot Y_j) + (X_k \cdot Y_i - X_i \cdot Y_k)|}{DET} \quad (3)$$

The first and second variant of the first phase of the method described above can be carried out by applying the above weighting coefficients. This can be effected by programming a computing device.

In the case that a pair of points is selected by applying weighting coefficients W the method will be adapted as follows.

For the points $P_i$, $P_1$, $P_k$ forming the triplet a factor $F_1$ is defined, which links the respective coordinates and the respective weighting coefficients of the points $P_i$, $P_1$, $P_k$. The factor $F_1$ is assigned to the central point 1, in such a way that:

$$F_l = \frac{W_l}{X_k - X_i} \cdot \left[ \frac{X_l - X_i}{W_k} + \frac{X_k - X_l}{W_i} \right]$$

This factor $F_1$ influences the determination of the intermediate point $P_1$ which is to be selected (i<1<k) to form the triplet, taking into account the weights assigned to the points. A point $P_1$ is selected and the regression line $D_1$ associated with the triplet $P_i$, $P_1$, $P_k$ and the error $E_{T1}$ associated with the triplet are calculated.

For the present variant of the method only the step A2 of the third variant (block 102b, FIG. 5) is modified. This step determines the existence and the value of an intermediate point serving to form a triplet. It is first attempted to form a regression line situated below $P_i$ and $P_k$. For each intermediate point $P_1$ it is ascertained if $F_1 = 1$ and $E_{PD}(P_i, D_1) < 0$. If at least one point satisfies this requirement there is no regression line situated below $P_i$ and $P_k$ and otherwise a quantity $G_{max}$ is determined which is the maximum value among:

on the one hand, the quantities $E_{ED}(P_i, D_p)$ for all the intermediate points, on the other hand, the following quantities (a), only for the intermediate quantities for which $F_1 < 1$, with $$\frac{F_l + 1}{F_l - 1} \cdot E_{PD}(P_i, D_l). \quad (a)$$

If there is at least one intermediate point such that $F_1 > 1$ a further quantity $G_{min}$ is defined, which is the minimum value assumed by (a) only for the intermediate points for which $F_1 > 1$. It is now checked if there is at least one intermediate point for which:

$E_{PD}(P_i, D_1) \geq 0$ $G_{max} \leq \alpha \cdot E_{T1}$ and $G_{min} \cdot \alpha \geq E_{T1}$ (α, coefficient≧1). If there is such a point it is chosen as the intermediate point in order to form the triplet.

If there is no intermediate point for which $F_1 > 1$, it is checked if there is at least one intermediate point such that:

$E_{PD}(P_i, D_1) \geq 0$ $G_{max} \leq \alpha \cdot E_{T1}$ (α: coefficient≧1).

If there is such a point it is chosen as the intermediate point to form the triplet.

If no triplet has been formed it is attempted to form a regression line situated above the points $P_i$ and $P_k$. The same method is applied with the sign of the errors $E_{PD}$ inverted.

If no point $P_1$ has been selected the process is restarted with another pair $P_i$, $P_k$.

When the set of points to be processed is too large to be represented by a single regression line the method uses a plurality of regression lines, which are each determined in accordance with the method described in the foregoing.

Figures 13, 14A:
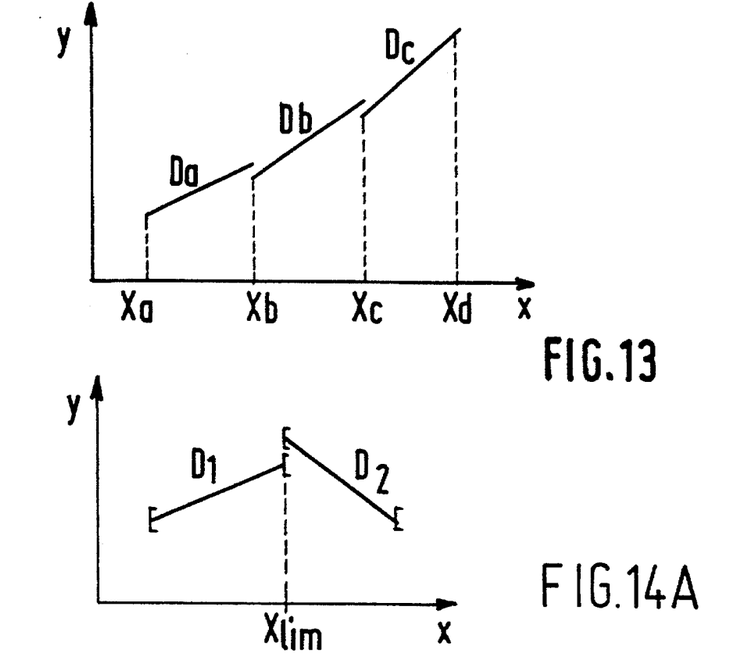

FIG. 13 gives an example in which the approximation function is formed by a plurality of regression lines.

In a first situation, on the basis of the knowledge of variables to be processed, it may be desired to impose limits on each regression line in accordance with the independent variable x. Thus, it may be desired to have a regression line $D_a$ between the values $[x_a, x_b[$ of the variable with the limit $x_a$ included and the limit $x_b$ excluded. The same applies to $[x_b, x_c[$ and $D_c$ for $[x_c, x_d[$ . In this case the problem is reduced to determining a straight line in a limited range and each time applying the method already described.

However, it is possible that for each line the method determines the limits in accordance with the independent variable x without these limits already being fixed at the start.

Figure 14B:
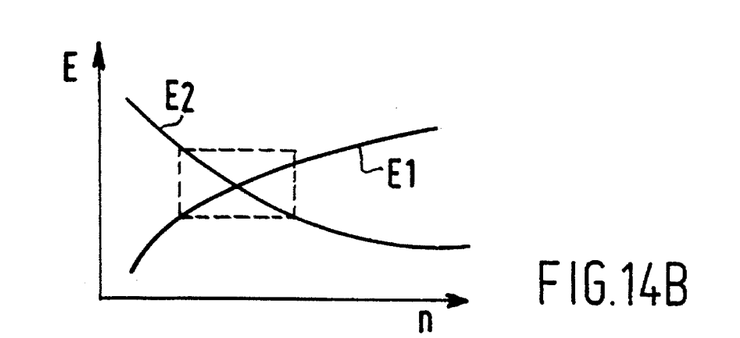

The principle of determining an optimum boundary between two adjacent regression lines is illustrated in FIG. 14-A. It is assumed that there are two non-optimum regression lines D1 and D2. The line D1 is determined starting from N1 points and the line D2 is determined starting from the N2 residual points with N1+N2= N, where N is the total number of points. The lines D1 and D2 form an approximation with maximal errors E1 and E2, respectively. When it is assumed that E2 is greater than E1 and that E2 is to be reduced, this will mean that a point belonging to D2 should be transferred to D1. When the number of points decreases the resulting error either remains the same or decreases. When the number of points increases the resulting error either remains the same or increases. In the present example the errors E1 and E2 as a function of the number n of points belonging to the lines D1 and D2 may vary as shown in FIG. 14-B. It follows that the resulting overall approximation by D1 and D2 is optimum when these errors are close to one another, i.e. situated in the zone bounded by a broken line in FIG. 14-B. These errors are not necessarily equal taking into account the discontinuous nature of the values of the independent variable.

To determine the abscissa value $X_{lim}$ between two straight lines:

the line D1 for a given number of points is determined and the maximum error E1 is calculated, the line D2 for the residual points is determined and the maximum error E2 is determined, E1 and E2 are compared and a point is transferred from the line having the larger error to the line having the smaller error, the limit value $X_{lim}$ is determined when a reversal occurs in the ratio between the two errors.

This method is applied recurrently to a plurality of lines which are bounded from one another by a plurality of abscissa limits.

The lines are determined from a discrete and limited series of measurement values. However, for the use of the regression lines it is necessary to define their domain, which extends over a continuum of values situated between two abscissa limits. The determination of the lines yields a series of straight lines whose ends are not necessarily connected to one another. For certain applications it may be useful to avoid that a deviation of the value of the dependent variable y occurs for adjacent values $(X_{lim}-\epsilon)$ and $(X_{lim}+\epsilon)$ of the independent variable, where $\epsilon$ is a very small value. It is possible to ensure that the abscissa limit $X_{lim}$ belongs exclusively to either line. It is also possible that the determination of the successions of lines is followed by an operation of joining the lines.

Figure 15:
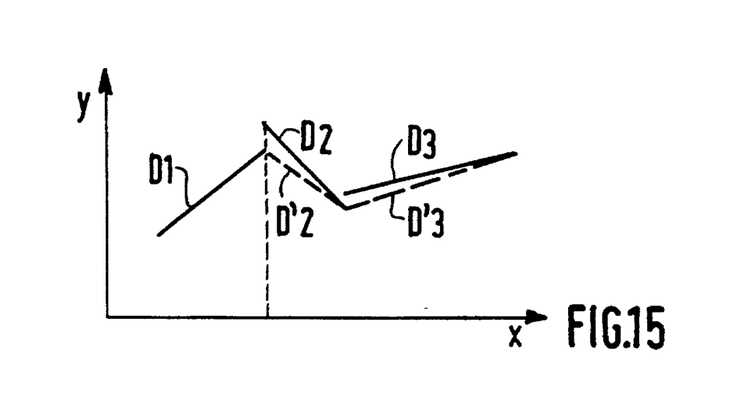
FIG. 15 is a representation relating to the joining of consecutive lines.

This is shown in FIG. 15. A solution may be to validate the line D1 up to the abscissa of the first point belonging to the line D2 and to recalculate the line D2 starting from the new value of the dependent variable y thus determined. Thus, by retaining the last point belonging to D2 a new line D'2 is determined, shown as a broken line in FIG. 15. A similar method may be applied to replace the line D3 by the line D'3. In this way a set formed by a plurality of regression fines is obtained which in the present example comprises the lines D1, D'2, D'3. This set forms an approximation to the measurement quantities by reduction of a maximum error between the measurement quantities and the set of lines. A variant which is more suitable for this reduction is to ensure that the lines corresponding to the largest errors impose their limit points as limit points on the lines corresponding to the smallest errors.

Apparatus for Carrying Out the First Phase

Figure 8:
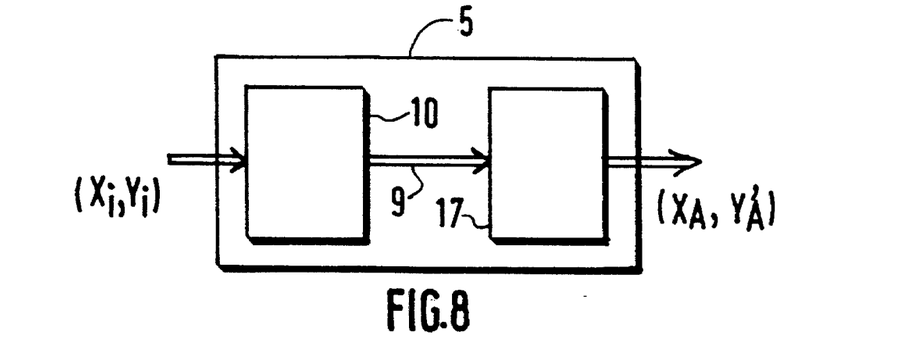
FIG. 8 is a diagram of an apparatus in accordance with the invention.

FIG. 8 shows a diagram of an apparatus for generating an approximation function in accordance with the invention. The apparatus 5 receives pairs $(X_i, Y_i)$ associating the dependent variable $Y_i$ with the independent variable $X_i$. The pairs $(X_i, Y_i)$ enter the first means 10 to determine and encode the linear regression function forming an approximation to the measurement pairs. The specific codes thus determined are transferred (line 9) to the second means 17, which determine second pairs $(X_A, Y_A)$ in accordance with specific codes of the approximation function.

A distinction is made between the second variant, which determines all regression lines passing through each possible combination of triplets with the series of first pairs, and the other variants, which for each regression line determined (in conjunction with its error $E_T$) one checks if the remaining additional points yield additional errors smaller than or equal to the error of the triplet $E_T$.

Figure 9:
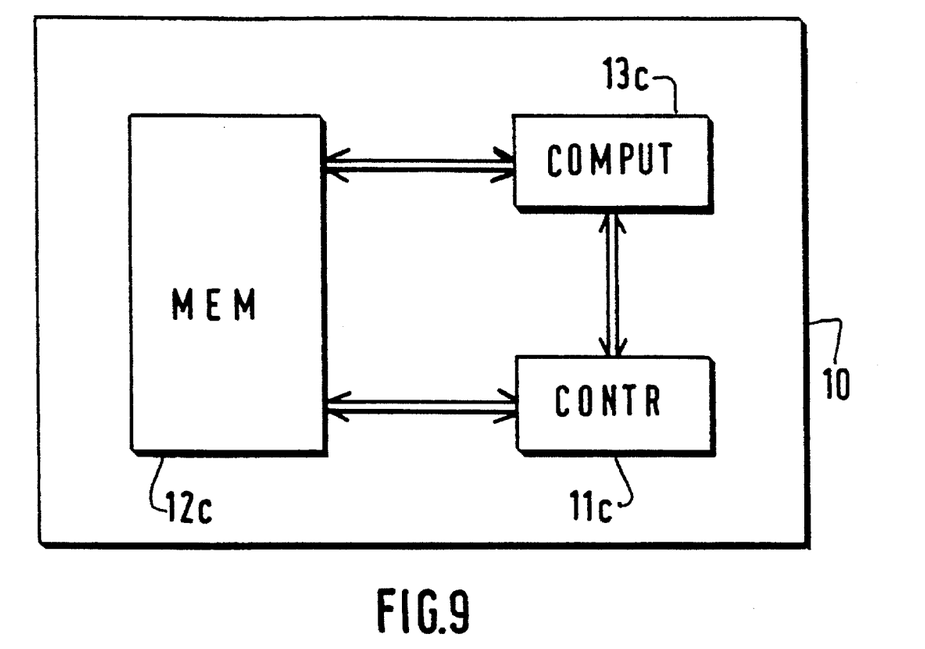
FIG. 9 is a diagram of a coding device for calculating and coding a regression line in general.

FIG. 9 shows an apparatus adapted to the second variant. It comprises:

a memory 12c MEM, which stores in particular all the points belonging to the set of points to be processed. These points are represented by their coordinates (x, y) and, if applicable, their weights W or their inverse weights 1/W, a computing unit 13c COMPUT, which for each selected triplet computes the regression line adapted to each triplet, i.e. the codes p, q of the line and the error $E_T$ associated with the triplet.

Moreover, a controller 11c CONTR enables the operations to be controlled and new triplets to be addressed by read-out/read-in of the memory 12c and loading the computing unit 13c with new triplets. Selection of the regression line to be retained, i.e. for the present variant the regression line providing the largest triplet error, is effected by the computing unit 13c.

Figure 10:
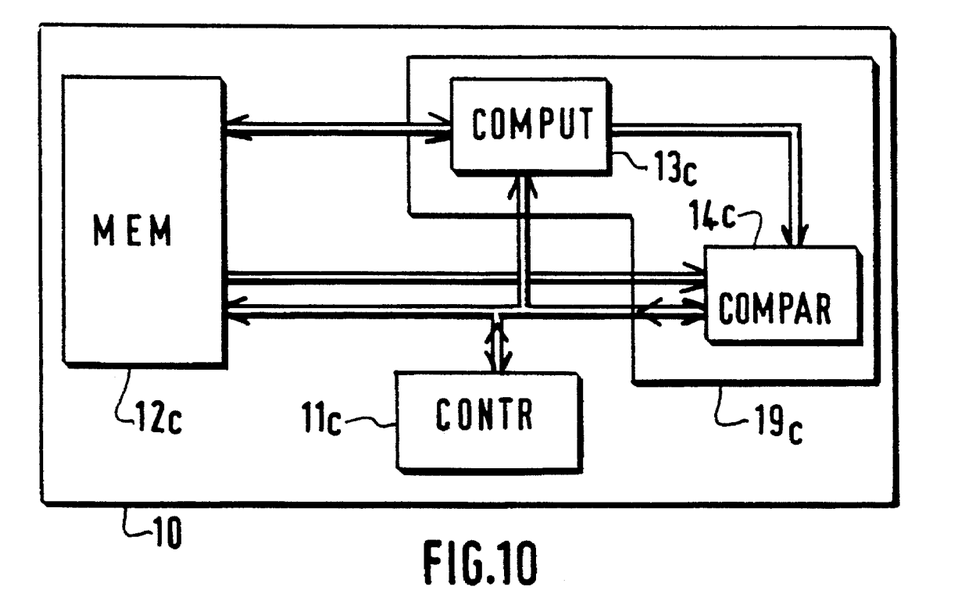
FIG. 10 is a diagram of a coding device for calculating and coding a regression line for the first variant.

FIG. 10 corresponds to other variants which for each current regression line examine if the other additional points of the series yield an error smaller than the triplet error.

For this purpose the first means 10 comprise a computing unit 13c and a comparison unit 14c forming computing means 19c.

The computing unit 13c transfers the codes p, q of the regression line of the current triplet to the comparison unit 14c COMPAR, which determines if the additional points of the set of points generate a smaller error with this regression line than with that generated by the points of the current triplet. For this purpose, the comparison unit 14c performs the following test:

$$|E_{Pm}|>E_T$$

If the current regression line is not accepted (positive test) another triplet is selected and a similar process is started again. If the test is negative for all the additional points the regression line is accepted and the computing unit 13c loads its parameters into the memory 12c.

For the variants operating on the basis of a pair of points the computing unit 13c is programmed to determine the intermediate points and to form triplets from the pairs of points, which in their turn may be derived from point envelopes. In the last-mentioned case the computing unit 13c is also programmed to determine the envelopes. Subsequently, the comparison unit 14c compares the errors relating to the various triplets.

To control the operations and address new triplets (when the triplets thus examined are not satisfactory) the apparatus, in the same way as above, comprises a controller 11c, which controls:

the read-out/read-in of the memory 12c, the loading of the computing unit 13c with new triplets, the transfer to the comparison unit 14c of all the additional points to be examined successively.

The first phase of the method can be carried out by comparison means 14c (FIG. 12) having a neural structure. The most complete case is considered, in which weighting coefficients are associated with each point $P_i$. When there are no weighting coefficients it suffices to give these coefficients the value unity in the following explanations. By way of example, the memory 12c (FIGS. 9, 10) can store the inverse values of the individual coefficients $W_i$ assigned to the points $P_i$. The computing unit 13c determines the codes –p, –q, $E_T$ and $-E_T$ for a given triplet in accordance with equations (2) and (3).

Figure 12:
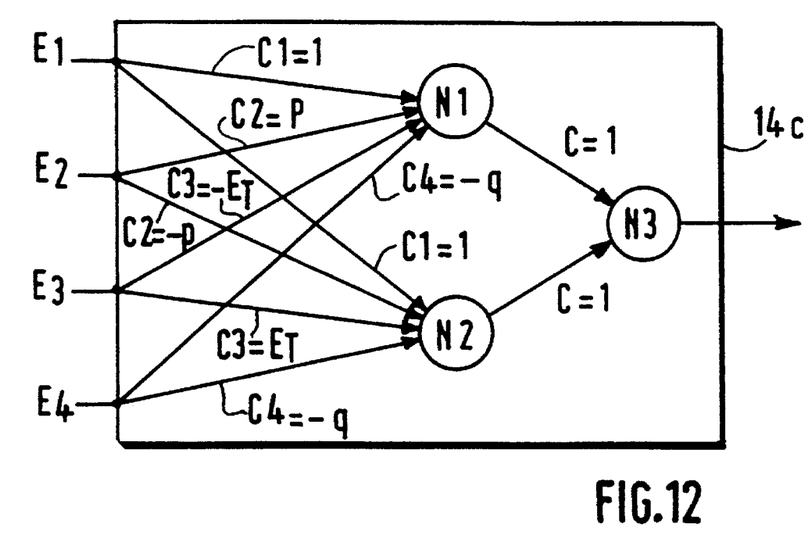
FIG. 12 is a diagram of a neural version of the comparison means of FIG. 10.

The requirement to be verified in the unit 14c for an additional point $P_m$ to be tested, having the parameters $X_m$, $Y_m$, $W_m$, is:

$$Y_m - pX_m - (E_T/W_m) - q > 0$$

where $Y_m - p.X_m + (E_T/W_m) - q < 0$.

These tests can be carried out easily by a unit 14c having a neural organisation. Indeed, these tests comprise linear functions, threshold functions and logic functions which can be realised easily in a neural network.

Such a neural comparison unit is shown in FIG. 12. It comprises three neurons N1, N2, N3. The neurons N1 and N2 receive data E1, E2, E3, E4. The neuron N3 receives the outputs from the neurons N1 and N2. Each of the inputs to these neurons is given a synaptic coefficient Ci in accordance with a known technique used in neural networks. This technique is described in, for example, R. P. LIPPMANN, "An introduction to computing with neural nets" IEEE ASSP Magazine, April 1987, pp. 4 to 22.

To carry out the above tests the neurons N1 and N2 are programmed in accordance with Table I:

TABLE I

| Neuron | $E_1$ | $C_1$ | $E_2$ | $C_2$ | $E_3$ | $C_3$ | $E_4$ | $C_4$ |
|---|---|---|---|---|---|---|---|---|
| 1 | $Y_m$ | 1 | $X_m$ | –p | $1/W_m$ | $-E_T$ | 1 | –q |
| 2 | $Y_m$ | 1 | $X_m$ | –p | $1/W_m$ | $E_T$ | 1 | –q |

All the synaptic coefficients of the neuron N3 are equal to 1.

The neurons N1 and N2 each compute a neural potential s such that: $s = \Sigma_i C_i . E_i$ To this potential s an activation function A should be applied. For the neurons N1 and N3 the activation function $A_1$ is:

$A_1(s) = 1$ if $s > 0$ $A_1(s) = 0$ if $s < 0$.

For the neuron N2 the activation function $A_2$ is:

$A_2(s) = 1$ if $s < 0$ $A_2(s) = 0$ if $s > 0$.

The output of the neuron N3 is 1 if the requirement to be verified is met and is 0 if it is not met.

It is to be noted that the data –p, –q, $-E_T$, $+E_T$ in the Table I are codes which appear as synaptic coefficients in the diagram of FIG. 12. The data $Y_m$, $X_m$, $1/W_m$ are data appearing at the inputs in the same diagram. When all the additional points have been tested and a regression line has been selected the codes p, q, W loaded into the memory 12c are subsequently used to carry out the second phase of the method (FIG. 11).

The significance of the neural version described herein is that the different operations to be performed in the variants already described can be carried out in parallel. Such a neural version then operates very rapidly.

Figure 11:
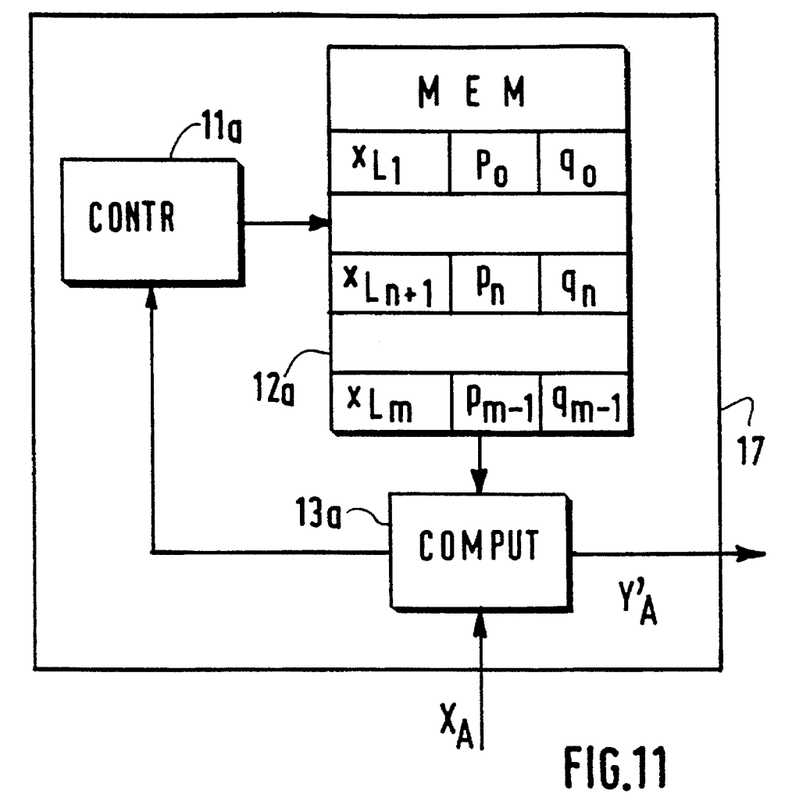
FIG. 11 is a diagram of a transcoding device for calculating values of the dependent variable from a set of coded regression lines.

When the regression lines have been determined the second phase consisting of the calculation of the second pairs $(X_A, Y'_A)$ of values of the variables is carried out in decoding means 17 (FIG. 11 ). The codes of the lines are loaded into a memory 12a, which in the course of the second phase is addressed by a controller 11a to supply the codes of the addressed regression lines. The memory 12a, which is for example organised in rows, contains for each regression line the parameters p, q and $x_L$, where $x_L$ is the upper limit of the abscissa for which each regression line is defined.

Thus, the memory 12a contains a table of parameters $X_{L1}, P_o, q_o$

. . .

$X_{Lm}, P_{m-1}, Q_{m-1}$ corresponding to m stored regression lines.

The decoding means 17 comprise:

the controller 11a, the memory 12a, and a decoding unit 13a. This decoding unit receives a requested value $X_A$ of the independent variable for which a result $Y'_A$ is to be obtained from the approximation function. For this purpose, the controller 11a successively supplies certain rows of codes from the memory 12a and for each row of codes the decoding unit 13a checks the code $x_L$ to determine if the value $X_A$ of the input variable can be processed by the regression line coded by said row. If this is not the case, the unit 13a requests another row of codes from the controller 11a. When this requirement is met the unit 13a performs the calculation:

$$Y'A = p_n X_A + q_n$$

whether the line of the order n is the required line.

As described above, the first means 10 may constitute a coding device and the second means 17 may constitute a decoding device, the two devices being separated. In fact, the devices may be remote from one another, the coding operations being separated from the decoding operations. However, the two means 10 and 17 may also form a single coding/decoding device. In the last-mentioned case certain elements may successively perform different operations. This means in particular that:

there may be a single memory 12 capable of storing the parameters of the pairs of values and the codes of the determined regression lines. The units 12a and 12c then form the memory 12.

there may be a single controller 11 which combines the functions of the controllers 11c and 11a, the computing unit 13c and the decoding unit 13a may also form a single unit 13.

It is also possible to realise the decoding means 17 (FIG. 11) in accordance with an organisation having a parallel structure. One possibility is then to compare the requested value $X_A$, in parallel, with all the codes $X_L$. This yields a group of signals $T_L$ representing the results of these comparison checks. Subsequently, for all the values of L a check is performed in parallel, in which the signals $T_L$ and $T_{L+1}$ are combined two by two and which indicates if the requested value $X_A$ is within the interval of the index L. This check is verified for a single value of L, designated n. This yields the corresponding codes $p_n$ and $q_n$ and from these codes the value $Y'_A$ is derived in the same way as described hereinbefore.

The first means 10 (coding) in conjunction with the second means 17 (decoding) can be used to determine the value of an approximation function by means of at least one regression line. These determinations can be effected for arbitrary values of the independent variable (within the predetermined limits defining the range of action of each regression line). This method precludes the unnecessary storage of tables of values, of which not all the values will be utilised. According to the method only the values necessary for the application are determined. The significance of the method in accordance with the invention is that it calculates only the necessary values. In combination with a neural processor the apparatus in accordance with the invention can be utilised to calculate a non-linear approximation function, for example a sigmoid function. A neural processor calculates neural potentials resulting from the sums of products of synaptic coefficients and neuron states. The technique is set forth in the above-mentioned document by R. P. LIPPMANN. Each neural potential should be subjected to the action of a non-linear function. For this, each neural potential forms the independent variable described in the foregoing and the calculation of, for example, the function th(x) is effected only for the requested useful values. The method supplies approximated values but this approximation can be obtained with an accuracy which can be increased as the number of calculated regression lines and, if applicable, weighting coefficients W increases. Nevertheless, the accuracy remains dependent upon the accuracy of the coordinates of the starting pairs.

A method of this type is of particular interest for the calculation of known functions (such as mathematical functions) or explicitly unknown functions, for example a function represented by measurement points, which is to be simplified by means of a linear regression function.

In its neural version the invention is interesting for neural applications because it provides not only a homogeneous processing but also a high degree of compactness of the necessary hardware architecture.

The variants of the method may be combined in their hardware implementations in order to combine their advantages. This yields, for example, the following advantages:

If there are weights, two combinations appear to be interesting:

The first combination in the first place uses the first variant based on triplets of points. If no solution is found a jump is made to the second variant, which is also based on triplets of points. This may have the following advantages:

A solution is obtained regardless of the data.

If always an accurate solution is required this combination enables a maximal speed to be obtained. In general, the solution is provided directly by the first variant selected, which is the variant which most rapidly provides an accurate solution in the case of weights. The second variant is much slower but ensures that the combination always provides a solution.

The second combination first of all uses the variant based on pairs of points. If it does not find a solution (which can be approximated) the second variant based on triplets of points is used. This yields the following advantages:

A solution is obtained regardless of the data (approximated, if necessary).

On an average this combination is faster than the preceding one.

On the other hand, it generally provides an approximated solution.

If there are no weights an interesting combination consists in first using the variant based on the envelope of points. If this variant does not provide a solution the second variant based on triplets of points is used. This yields the following advantages:

A solution is obtained regardless of the data.

This combination provides the best average speed.

When the linear regression function has been determined in accordance with the described method it is possible to determine not only the values $Y'_A$ which follow from said function but also the values which follow from the derivative of this function. As a matter of fact, for a requested value $X_A$ of the independent variable it is only required to read the value p deduced from the value $X_A$ from the storage means in order to obtain the value of the corresponding derivative.

I claim:

1. An apparatus (5) for generating an approximation function based on first pairs (($X_1$, $Y_1$) to ($X_6$, $Y_6$)) of values associating a dependent variable ($Y_1$ to $Y_6$) with an independent variable ($X_1$ to $X_6$), and for determining second pairs ($X_A$, $Y'_A$) of values of said variables in accordance with said approximation function, characterized in that the apparatus comprises:

first means (10):

for iteratively determining at least one current linear regression function by making first errors of alternating sign equal in absolute value, which first errors have been measured between, respectively, first values ($Y_3$, $Y_4$, $Y_5$) of the dependent variable for three pairs ($X_3$, $Y_3$) ($X_4$, $Y_4$) ($X_5$, $Y_5$) of a series of pairs, and second values ($Y'_3$, $Y'_4$, $Y'_5$) of the dependent variable determined, in accordance with said current linear regression function, for the same values ($X_3$, $X_4$, $X_5$) of the independent variable, for selecting that one of the current linear regression functions which produces an approximation of all the pairs of said series with a minimum error, and for coding the selected linear regression function with the aid of specific codes (p, q), and second means (17) for determining said second pairs ($X_A$, $Y'_A$) with the aid of said specific codes.

2. An apparatus as claimed in claim 1, characterized in that the first means (10) comprise:

storage means (12c) for storing the values of the first pairs and said specific codes, calculation means (13c) (19c) for successively calculating the specific codes (p, q) of current linear regression functions and their respective first errors, equalized in absolute value ($E_T$), and for selecting at least one current linear regression function, and means (11c) for controlling the storage means (12c) and the calculation means (13c).

3. An apparatus (5) as claimed in claim 1, characterized in that for selecting said linear regression function the first means comprise means (14c):

for likewise determining additional errors for the other pairs ($X_1$, $Y_1$) ($X_2$, $Y_2$) ($X_6$, $Y_6$) of values of said series, for comparing the additional errors with said equalized first errors ($E_T$), and for selecting the current linear regression function which yields additional errors which, in absolute value, are smaller than or equal to said equalized first errors ($E_T$).

4. An apparatus as claimed in claim 2, characterized in that for selecting the linear regression function the calculation means (13c) select that one of the current linear regression functions which yields maximal equalized first errors ($E_T$).

5. An apparatus as claimed in any one of the claim 1, characterized in that said second means (17) comprise:

storage means (12a) for storing said specific codes of at least one linear regression function, calculation means (13a) for selecting, in response to a value of the independent variable ($X_A$), a linear regression function belonging to said value, and for calculating, starting from the specific codes received from the storage means, a value of the dependent variable ($Y'_A$) associated with the value of the independent variable ($X_A$), and means (11a) for addressing the specific codes of the linear regression function to the calculation means at the request of said means.

6. In an apparatus for generating an approximation function based on first pairs (($X_1$, $Y_1$) to ($X_6$, $Y_6$)) of values associating a dependent variable ($Y_1$ to $Y_6$) with an independent variable ($X_1$ to $X_6$), a method of generating said approximation function based on first pairs ($X_1$, $Y_1$) ($X_6$, $Y_6$) of values, and for determining second pairs ($X_A$, $Y'_A$) of values of said variables in accordance with said approximation function, characterized in that the method comprises:

a first phase:

for iteratively determining at least one current linear regression function by making first errors ($E_{PD}$) of alternating sign equal in absolute value, which first errors have been measured between, respectively, first values ($Y_3$, $Y_4$, $Y_5$) of the dependent variable for three pairs ($X_3$, $Y_3$) ($X_4$, $Y_4$) ($X_5$, $Y_5$) of a series of pairs, and second values ($Y'_3$, $Y'_4$, $Y'_5$) of the dependent variable determined, in accordance with said current linear regression function, for the same values ($X_3$, $X_44$, $X_5$) of the independent variable, for selecting that one of the current linear regression functions which produces an approximation of all the pairs of said series with a minimum error, and for coding the selected linear regression function with the aid of specific codes, and second means (17) for determining said second pairs ($X_A$, $Y'_A$) with the aid of said specific codes.

7. A method as claimed in claim 6, characterized in that the first phase includes the following steps:

A—selecting (102) three pairs (P3, P4, P5) of values from said series,

B—calculating (104) the current linear regression function D and determining an associated triplet error $E_T = |E_{PD}|$, C—selecting (106) an additional pair (P1), (P2), (P6), D—calculating (108) an additional error $E_{Pm}$ between the additional pair and said function, E—if $|E_{Pm}| \leq E_T$ (110) for the additional pair (110) the method proceeds with step C with a following additional pair, and F—if $|E_{Pm}| > E_T$ for at least one additional pair (110) the method proceeds with step A with a selection of another group of three pairs from said series of pairs, and G—if $|E_{Pm}| \leq E_T$ for all the additional pairs (112) the current linear regression function is coded and stored (114) as a linear approximation function.

8. A method as claimed in claim 6, characterized in that the first phase includes the following steps:

A—selecting (102) three pairs (P3, P4, P5) of values from said series,

B—calculating (104) the current linear regression function D and determining an associated triplet error $E_T = |E_{PD}|$, C—comparing (210) the error $E_T$ with an optimum error $E_{op}$ having a strictly negative initial value, D—if $E_T > E_{op}$ updating (114) the optimum error $E_{op}$ by replacing $E_{op}$ by $E_T$ and updating the codes of an optimum linear regression function $D_{op}$ by replacing these codes by the codes of the current linear regression function (D), E—subsequently returning (116) to step A to select three other pairs, and F—when all the triplets of pairs of values of the series have been checked (116) the last codes of the optimum linear regression function $D_{op}$ will form the codes of the linear approximation function (114).

9. A method as claimed in claim 8, characterized in that the first phase includes the following modified steps:

A1—modification of step A by effecting a selection (102a) of two pairs of values belonging to said series, such that there is at least one additional intermediate pair with an independent variable ($X_1$–$X_6$) situated between the independent variables of said pair in order to form at least one triplet of pairs of values, A2—modification of step A, firstly, by determining (102b) a subsidiary linear function which contains the two selected pairs and, secondly, by determining second errors between the dependent variables of the possible intermediate pairs and said subsidiary linear function:

and, when these second errors all have the same sign, selecting the intermediate pair producing the second error having the largest absolute value in order to form a triplet of pairs of values formed by the intermediate pair and the two selected pairs, and, when these second errors have different signs, resuming the method in step A1, B1—step B (104) is effected with said selected triplet, C1—modification of step C (106) by selecting an additional pair whose independent variable is not situated between the independent variables of the two selected pairs.

10. A method as claimed in claim 9, modified in that, prior to the step A1, said pairs of values being represented as points (P1–P6) in a two-dimensional space, the first phase of the method includes a step (100a) to determine a lower envelope and/or an upper envelope which interconnect the outer points of the set of points, the selection of the two pairs of values in the step A1 being made from adjacent points belonging to one of the envelopes.

11. A method as claimed in in any one of the claim 6, characterized in that a specific weighting coefficient, which weights said first errors, is associated with each value in the series of values of the independent variable.

12. A method as claimed in any one of the claim 6, characterized in that it generates an approximation function comprising a series of interlinked linear regression functions.

13. Data processing system comprising, in succession, an input neuron layer, at least one hidden neuron layer, and an output neuron layer, means for calculating neural potentials of the neurons in the output neuron layer by cumulating activities of previous layers connected thereto, means for delivering output neurons states by applying an activation function to the neural potentials, wherein the system comprises:

a) means for storing pairs of values of the activation function, as values of an independent variable and as values of a dependent variable defining the activation function, b) first calculation means for computing a linear regression function approximating the pairs of values within a predetermined error, and for coding the linear regression function, c) second calculation means addressing the codes for computing the output neuron states by applying the activation function to the neural potentials on the basis of the codes of the linear regression function.

14. Data processing system as claimed in claim 13 wherein the first calculation means determines the linear regression function by equalizing, in absolute value, a primary error over two or three pairs of values and testing whether secondary errors for the remaining pairs of values are less than or equal to the primary error, the primary and secondary errors being measured between each pair of values and the linear regression function.

15. Data processing system as claimed in claim 14 wherein the primary error and the secondary error are weighted with specific weighting coefficients.

16. Data processing system as claimed in claim 14 wherein the first calculation means splits the pairs of values in a plurality of sub-sets, the first calculation means determining one linear regression function for each sub-set and computing the codes for each sub-set, the system comprising means for selecting the sub-set specific to the output neuron potential to process and for addressing to the second calculation means the codes peculiar to the linear regression function of the sub-set selected.

17. Apparatus for generating an approximation function approximating first pairs of values, a pair comprising one value of an independent variable and one value of a dependent variable, and for computing second pairs of values based on the approximation function for request values of the independent variable, wherein the apparatus comprises:

a) means for storing the first pairs of values, b) first calculation means for computing the approximation function as a linear regression function approximating the first pairs of values to within a predetermined error, and for delivering codes coding the linear regression function, c) second calculation means for computing the second pairs of values based on the codes of the linear regression function.

18. Apparatus as claimed in claim 17 wherein the first calculation means equalizes, in absolute value, a primary error over two or three pairs of the first pairs of values, and tests that secondary errors for the remaining pairs of values are less than or equal to the primary error, the primary and secondary errors being measured between each pair of values and the linear regression function.

19. Apparatus as claimed in claim 18, wherein the primary error and the secondary errors are weighted with specific weighting coefficients.

20. Apparatus as claimed in claim 18 wherein the first calculation means splits the pairs of values into a plurality of sub-sets, the first calculation means determining one linear regression function for each sub-set and computing the codes for each sub-set, the apparatus comprising means for selecting the sub-set specific to the request value and for addressing to the second calculation means the codes peculiar to the linear regression function of the sub-set selected.

* * * * *